(12) United States Patent
Appolloni

(10) Patent No.: US 7,098,915 B2
(45) Date of Patent: Aug. 29, 2006

(54) SYSTEM AND METHOD FOR DETERMINING LINE-OF-SIGHT VOLUME FOR A SPECIFIED POINT

(75) Inventor: Thomas J. Appolloni, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 213 days.

(21) Appl. No.: 10/950,804

(22) Filed: Sep. 27, 2004

(65) Prior Publication Data

US 2006/0066608 A1  Mar. 30, 2006

(51) Int. Cl.
*G06T 15/00* (2006.01)

(52) U.S. Cl. .................... 345/427; 342/453; 378/4

(58) Field of Classification Search ............ 345/420, 345/427, 619, 421; 342/453, 587; 378/4
See application file for complete search history.

(56) References Cited

U.S. PATENT DOCUMENTS

| | | | |
|---|---|---|---|
| 6,002,738 A * | 12/1999 | Cabral et al. ............... 378/4 |
| 6,411,298 B1 | 6/2002 | Goto et al. ............... 345/427 |
| 6,522,296 B1 | 2/2003 | Holt ............... 342/453 |
| 6,529,206 B1 * | 3/2003 | Ohki et al. ............... 345/619 |
| 6,580,393 B1 | 6/2003 | Holt ............... 342/453 |
| 6,608,593 B1 | 8/2003 | Holt ............... 342/453 |
| 6,744,442 B1 | 6/2004 | Chan et al. ............... 345/587 |
| 6,803,910 B1 * | 10/2004 | Pfister et al. ............... 345/420 |
| 6,903,738 B1 * | 6/2005 | Pfister et al. ............... 345/420 |

* cited by examiner

*Primary Examiner*—Phu K. Nguyen
(74) *Attorney, Agent, or Firm*—Allen, Dyer, Doppelt, Milbrath & Gilchrist, P.A.

(57) ABSTRACT

A system and method determines a Line-of-Sight volume for a specified point within a three dimensional model. Each data file includes data about geometric entities that make-up a geographic feature that may impact a Line-of-Sight from a focus. A processor is operative for processing the data files and creating a series of polygons that represent a shell of a Line-of-Sight volume to the focus at a specified resolution based on the process data files.

48 Claims, 20 Drawing Sheets

ARRAY SHOWING EACH RAY DISTANCE (INITIAL)

| el \ az | 0 | 1 | 2 | 3 | 4 | ... | 359 |
|---|---|---|---|---|---|---|---|
| 90 | 50 | 50 | 50 | 50 | 50 | ... | 50 |
| 89 | 50 | 50 | 50 | 50 | 50 | ... | 50 |
| 88 | 50 | 50 | 50 | 50 | 50 | ... | 50 |
| ... | ... | ... | ... | ... | ... | ... | ... |
| 1 | 50 | 50 | 50 | 50 | 50 | ... | 50 |
| 0 | 50 | 50 | 50 | 50 | 50 | ... | 50 |
| -1 | 50 | 50 | 50 | 50 | 50 | ... | 50 |
| ... | ... | ... | ... | ... | ... | ... | ... |
| -88 | 50 | 50 | 50 | 50 | 50 | ... | 50 |
| -89 | 50 | 50 | 50 | 50 | 50 | ... | 50 |
| -90 | 50 | 50 | 50 | 50 | 50 | ... | 50 |

INITIAL LOS SPHERE ABOUT POINT P

SYSTEM AND METHOD FOR DETERMINING LINE-OF-SIGHT VOLUME FOR A SPECIFIED POINT

FIELD OF THE INVENTION

The present invention relates to the field of imaging, and more particularly, the present invention relates to a system and method for determining a Line-of-Sight (LOS) volume for a specified point in a three-dimensional model.

BACKGROUND OF THE INVENTION

When working within a three-dimensional model for applications such as personnel or camera placements, or for example, determining a Line-of-Sight for target acquisition or laser sighting in weapons delivery, a planner must verify that there is a clear Line-of-Sight from a specific position or target to any other point within the area of operation. This information is important to determine flight parameters for aircraft in target acquisition or planning or determine blind spots in ground operations for camera or personnel placement, for example.

Traditional two-dimensional maps cannot provide this information because the heights of relative objects is an unknown quantity. Additionally, placing a camera within a three-dimensional scene at a selected point does not provide this information because a camera cannot always be accurately placed and camera imaging does not provide intuitive confirmation across large distances.

A true, three-dimensional (3D) virtual environment requires the generation of an accurate Line-of-Sight (LOS) volume based upon a specific point referred to as the focus. By definition, a Line-of-Sight volume, when integrated into a three-dimensional environment, will give a user the ability to determine instantly a clear Line-of-Sight to the designated focus by observing the camera placement inside or outside of the rendered Line-of-Sight volume. A rendering of a Line-of-Sight volume will also allow its use outside of traditional data visualization where three-dimensional data analysis is performed.

Currently, there are no known applications that produce true three-dimensional Line-of-Sight volumes. U.S. Pat. No. 6,411,298 to Goto et al., the disclosure which is hereby incorporated by reference in its entirety, discloses a method and apparatus that determines visual points and direction of Line-of-Sight in three-dimensional image construction. The system and apparatus of Goto et al. primarily determines a visual point and direction for a Line-of-Sight in a three-dimensional image construction used for imaging blood vessels and similar pathways. A viewpoint is set on an intersection of two arbitrary multi-planar reconstruction (MPR) images. A Line-of-Sight is displayed on a plane, including either one of the two MPR images. The geometric positional relationship of the two MPR images, their intersection and viewpoint, and Line-of-Sight, are designated with a positional input device, for example, a computer mouse, to enable rearrangement of the geometric positional relationship. By outputting an instruction to move the position and direction of a marker on the plane, including a first sectional image, and updating the viewpoint and Line-of-Sight, it is possible to set an estimated viewpoint and Line-of-Sight. Goto et al. is limited, however, in its applicability for generating an accurate Line-of-Sight volume based upon a specific point as a focus in a three-dimensional environment.

In another application for generating a Line-of-Sight, ESRI Company of Redlands, Calif., has developed a software program that produces multi-colored lines radiating out from ground based points along a terrain surface. These multi-colored lines indicate those areas that have Line-of-Sight to a point, but only along a surface. This program, however, does not have sufficient resolution for some end-use applications. This program is perhaps advantageous from a point out across the scene, but it is not sufficiently adequate for scenarios that determine Line-of-Sight capabilities for antenna placement, blind spots across a radar sweep, or similar applications requiring a Line-of-Sight volume for a specified point in a three-dimensional model.

SUMMARY OF THE INVENTION

It is therefore an object of the present invention to determine Line-of-Sight capabilities for producing three-dimensional Line-of-Sight volumes that overcome the drawbacks indicated above.

In accordance with the present invention, a point is designated in three-dimensional space and the
initial shape of a volume to be displayed is defined. These volumes could be, for example, a full sphere, an upper hemisphere or lower hemisphere. The initial shape is defined and the resolution at which the volume is to be displayed is defined, for example, at 2°, 5° or 10° increments. The radius of the volume is defined and is calculated from a specified point.

The system incorporates appropriate algorithms and calculates the volume. It automatically loads the data into a program once the calculations are complete. Thus, a situation planner can have immediate information as to what locations in three-dimensional space have Line-of-Sight to a specific location within a three-dimensional model of an area of interest. It is possible for a user, for example, a situation planner, to move to any point in a scene and determine the Line-of-Sight to that point.

In accordance with the present invention, a system and method determines a Line-of-Sight volume for a specified point within a three dimensional model. A focus point is defined in three dimensional space. A plurality of data files each correspond to a geographic feature that may impact a Line-of-Sight from the focus. Each file includes data about geometric entities that make-up a geometric feature. A processor is operative for processing the data files and creating a series of polygons that represent a shell of a Line-of-Sight volume to the focus at a specified resolution based on the process data files.

In one aspect of the present invention, the processor is operative for processing each data file as a minimally-sized bounding volume that contains the geometric entities that make-up a geographic feature and determining if a ray cast from the focus to the closest point of the bounding volume intersects the initial shape of the volume within the specified distance. The geographic feature can comprise a building or other geographic feature that could intersect the Line-of-Sight from the focus.

In another aspect of the present invention, a single output file is output as a series of polygons that represent the shell of the Line-of-Sight volume. The processor is also operative for computing the azimuth and elevation range of a polygon in determining the distance from the focus to a point line within the polygon. Each data file could be formed as a collection of polygons with each polygon's vertices contained within a common plane. A representative example of a polygon could be a triangle.

The processor is also operative for changing the resolution to enhance rendering speed for calculating the shell of the Line-of-Sight volume. Different surfaces of the shell could be defined, including a general spline based or NURBS (non-uniform rational B-splines) surface.

In yet another aspect of the present invention, the focus point could be defined in three dimensional space as part of an initial shape for a volume defined as if there were no obstructions from the focus based on a specified distance. This initial shape could be a full hemisphere shape, one of an upper or lower hemisphere, a horizontal cross-section of a sphere having user defined upper and lower vertical distances either relative to the focus or if geospatially referenced in absolute altitudes, longitudinal hemispheres based on either selected directions or an amount of obscuration, or conical shaped from one selected point towards the focus with a selected field of view angle.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously provides a system and method that determines a Line-of-Sight volume for a specified point within a three-dimensional model. It overcomes the disadvantages of working within a three-dimensional model in which the placement of personnel or cameras or weapons delivery cannot be verified for a clear Line-of-Sight from a specific position or target to any other point within the area of operation. It overcomes the disadvantages of using traditional two-dimensional maps that cannot provide this information because the heights of all relative objects is an unknown.

Figure 1:
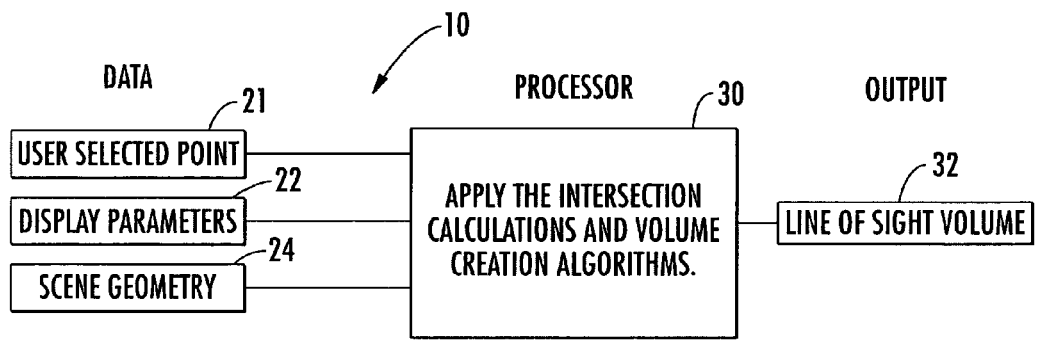
FIG. 1 is a block diagram showing data that is input for applying the intersection calculations and volume creation algorithms and determining a Line-of-Sight volume in accordance with the present invention.

FIG. 1 is a high level block diagram of the system 20 of the present invention and showing the type of general data that is input for processing and subject to the intersection calculations and volume creation algorithms and determining a Line-of-Sight volume in accordance with the present invention. Data regarding a user selected point 21, display parameters 22 and scene geometry 24 are input to a processor 30, which applies the intersection calculations and volume creation algorithms for determining the Line-of-Sight volume 32 in accordance with the present invention. Non-limiting examples of these intersection calculations and volume creation algorithms are shown in the flow charts of FIGS. 5–12. Given certain parameters that are input by a user, the algorithms allow the Line-of-Sight volume to be calculated. The algorithms that can be applied can be a modified "ray tracing" algorithm. Each building can be taken as a starting point and a determination can be made whether each building is in the operating radius that a user has defined. The buildings are broken down into respective polygons. If there is a point in space and nothing interferes, the building is contained within a sphere or other volume defined by the user. If an object is in the way, it is "cut" into pieces by the algorithms to determine the Line-of-Sight.

As understood by those skilled in the art, ray tracing simulates the physics of a photograph in a three-dimensional environment, for example, by tracing a path taken by a ray of light through a scene and calculating reflection, refraction, or absorption of the ray when it intersects an object. Ray tracing can encompass forward or backward ray tracing, and encompass the formation of ray trees and ray-object intersections by computing the intersection of an object and the ray using a point-sampling technique. Of course, one essential aspect in any ray tracing algorithm is the repeated intersection of rays with objects. The present invention could use specialized system hardware to accelerate mathematical operations, for example, by using a chip that computes intersections of rays with a class of curved surfaces. Circuit structures or enhanced software or a combination ob both can be used to accelerate ray-object intersections as hybrid hardware/software solutions.

Bounding volume hierarchies can also be used in accordance with the present invention. The bounding volume, for example, could be a shape that completely encloses one or more smaller shapes. It usually takes the form of a simplified box or sphere to simplify initial calculations, instead of initially processing extensive data for complicated objects. When a ray does not intersect a bounding volume, it does not intersect any of the objects within the bounding volume and those objects do not have to be examined. Thus, objects in a scene can be arranged in a hierarchy of bounding volumes. A ray can thus be traced by intersecting it against each of the bounding volumes. Only those objects that are intersected require analysis. The present invention, however, is not limited to the use of bounding volumes. Space subdivision can also be used in which three-dimensional space is subdivided into smaller regions, for example rectangular boxes. Directional data structures could also be used.

The coordinate system used for the present invention is described as a right-handed xyz coordinate system, with the xy plane being the horizontal reference plane. The y-axis preferably represents north and the x-axis represents east. The z-axis represents "up," i.e., vertical relative to the xy plane. The origin (0,0,0) is an arbitrarily selected point within the three-dimensional environment. This origin should not extend far outside the bounds of a model because earth curvature can cause distortion if the model is geospatially accurate and modeled to properly lie on the Earth's ellipsoid. In this non-limiting description, all azimuths are measured in a clockwise direction from the north (y) axis, and all elevations are measured relative to the horizontal (xy) plane (+90° to −90°).

While there are many methods that might be used to optimize processing of the geometry and improving the algorithms described below as non-limiting examples, all algorithms, which could be used with the present invention would follow a similar processing path. In this description for the described example, the geometry represents an urban model. Each building is its own separate file of geometric entities. The underlying terrain is broken into a series of non-overlapping grids and each represented within a single file. Other methods of geometric data could also be used without extensively modifying the data processing. Additionally, each file of geometric entities could also include the coordinates of a minimally sized xyz axis oriented cube, i.e., a bounding cube, which will contain all the geometry within the file. The geometry contained within each file could be a collection of polygons, with each polygon's vertices in a common plane. Other geometric surfaces could also be used by the algorithms and will only impact the intersection calculations.

While geometry will normally dictate the actual shape of the Line-of-Sight volume, the user can define the configuration (shape) that the volume would have if there were no obstructions anywhere within the scene. While there are any number of initial shapes that might be made available to the user, the choices presented in the example flow charts are: (a) a full sphere with the focus at the center of the sphere; (b) an upper hemisphere with the focus at the center of the base equator rim; (c) a lower hemisphere with the focus at the center of the top equator rim; and (d) a horizontal cross section of a sphere where the user defines the upper and lower vertical distances either relative to the focus, or if geospatially referenced, in absolute altitudes.

Additional shapes for consideration depending on the specific application might include: (a) longitudinal hemispheres based on either selected directions or amount of obscuration; (b) conical shapes from one selected point towards the focus with a selected field of view angle; and (c) other shapes as suggested by those skilled in the art.

The examples as described could calculate the Line-of-Sight volume in one degree (1°) increments. This generated volume, however, could cause unacceptable rendering delays or be more than the operator requires. Therefore, the following description presents the final Line-of-Sight volume that is generated in 2°, 5° or 10° segments as its resolution. It is also possible to change the resolution with the Line-of-Sight volume. The resolution can be more fine or more coarse. Additionally, the output resolutions can be easily adjusted to a resolution that better suits the application to which the Line-of-Sight volume is applied.

In this description, the operating radius (distance) from the focus can represent the maximum distance out to which the Line-of-Sight volume will extend when unobstructed.

A single file can be output in accordance with the present invention. This output file can contain a series of triangles that represent the shell of the Line-of-Sight volume to the focus, which is calculated against any supplied files, at the specified resolution, and out to the specified distance. The output can be three-dimensional polygons, for example, triangles as described. Different surfaces, however, can be defined, for example, general spline based, NURBS (Non-uniform Rational B-Splines) and similar surfaces with the processed Line-of-Sight volume information. The output file can be of any file format capable of defining selected three-dimensional geometric shapes. Once the Line-of-Sight volume has been calculated, different output files can be created. Formats vary greatly and any format that is capable of adequately containing the selected 3D geometric shapes would be sufficient as an output file.

Figure 2:
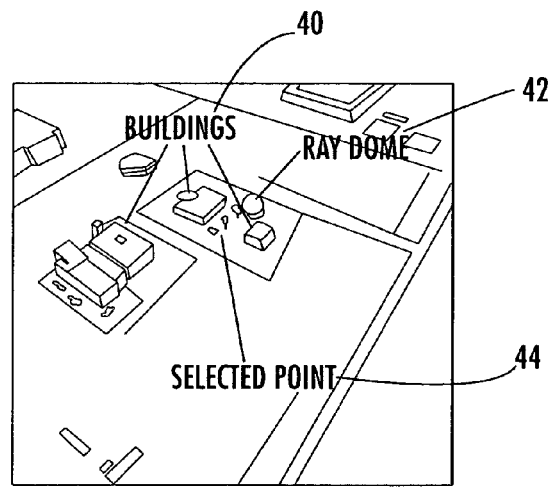
FIG. 2 is an image showing buildings, including a Ray dome, and a selected point, used to determine a Line-of-Sight volume in accordance with the present invention.
Figure 3:
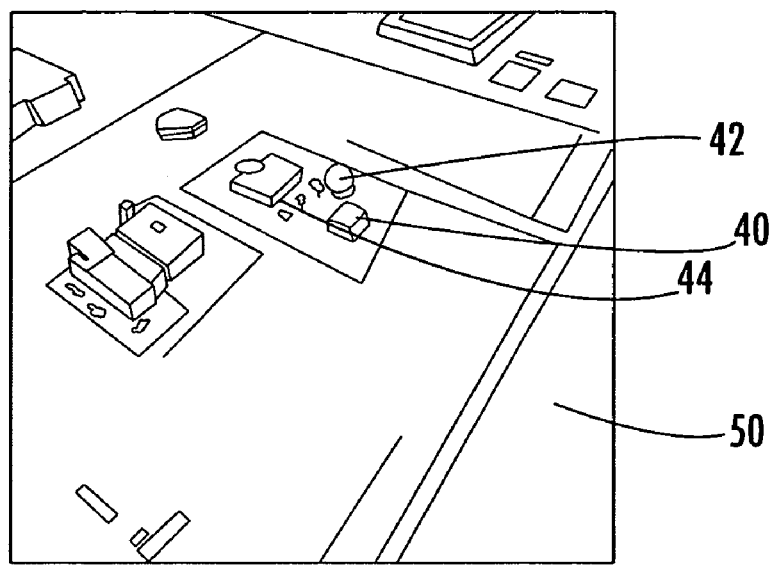
FIG. 3 is an image similar to FIG. 1, but showing a lower hemisphere with a 200-meter radius in which the Line-of-Sight is to be determined in accordance with the present invention.
Figure 4:
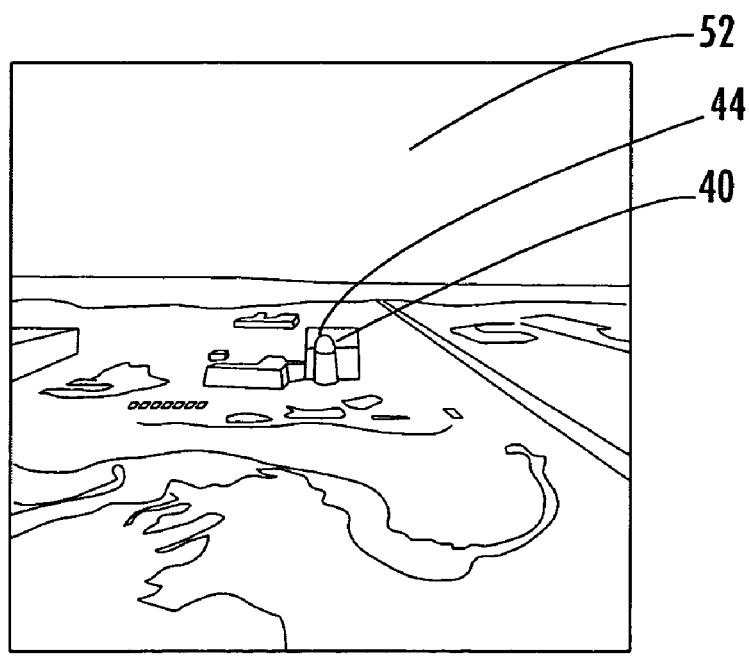
FIG. 4 is an image similar to FIG. 3 but looking in a different direction and showing a full sphere with a 200-meter radius, in which the Line-of-Sight is to be determined in accordance with the present invention.

FIG. 2 shows a geographical image of a landscape in which a Line-of-Sight volume is to be determined. The image includes buildings 40, a Ray dome 42, and a selected point 44, which is used and applied for determining a Line-of-Sight volume in accordance with the present invention. FIG. 3 is an image similar to FIG. 2, and showing a lower hemisphere 50 with a 200-meter radius for Line-of-Sight calculations. FIG. 4 is an image similar to FIGS. 2 and 3, but looking in a different direction and showing a full sphere 52 with a 200-meter radius. Different flight path keys could be implemented in a software application for use with calculated Line-of-Sight determinations. This software could be used for determining flight parameters and a flight path. These flight path keys can include adding a waypoint; removing the last waypoint; remove an entire flight path; show or hide a flight path; start a flight; pause or resume a flight; save a flight path; load a flight path; fly a linear path; or fly a curved path.

Referring now to FIGS. 5–12, a series of high level flow charts are set forth, which illustrate examples of different steps used for determining a Line-of-Sight volume in accordance with the present invention. As shown at block 100 on FIG. 5, a data structure as a spoke is created to store a single real value for each azimuth (0° to 359°). This data structure would contain a full set of elevation readings, for example, +90° to −90°. There could be [65, 160 entries] or [0 . . . 359, +90° to −90°]. For all the determined spokes, a distance is created (block 102) in which the spoke [I]=the distance. FIGS. 13a and 13b are a table and graph showing details of the data structure and spoke as an example. The azimuth/elevation data structure in the table of FIG. 13a are data representative of each ray distance for d=50. Its physical representation is shown in the graph of FIG. 13b, with an initial Line-of-Sight sphere about a point "p".

After determining a distance for the spokes, a determination is made whether there are any remaining files in the list of three-dimensional files for the environment (block 104). If there are no remaining files, the algorithm proceeds to build its volume (block 106) using the algorithm shown in the flow chart of FIG. 8. If there are remaining files, for the next file in the environment, a bounding cube is obtained for the geometric entities (block 108). Geometry files (block 110) can be input to aid in establishing the bounding cube. This geometry data can be determined from a database, for example as part of an image modeling software, as will be explained below.

A determination is made whether a ray is cast from the focus to the closest point of the bounding cube and whether it intersects the bounding cube within the distance (block 112). If not, then the loop back occurs and a determination is made whether there are remaining files in the list of three-dimensional files (block 104). If yes, the algorithm continues with the process shown in FIG. 6 (block 114). User supplied or other data relating to the focus, shape, resolution, and distance (block 116) can be input to aid in determining whether a ray intersects the cube within the distance. Once the volume is built an output file is written (block 118) and the system returns (block 120).

Figure 14:
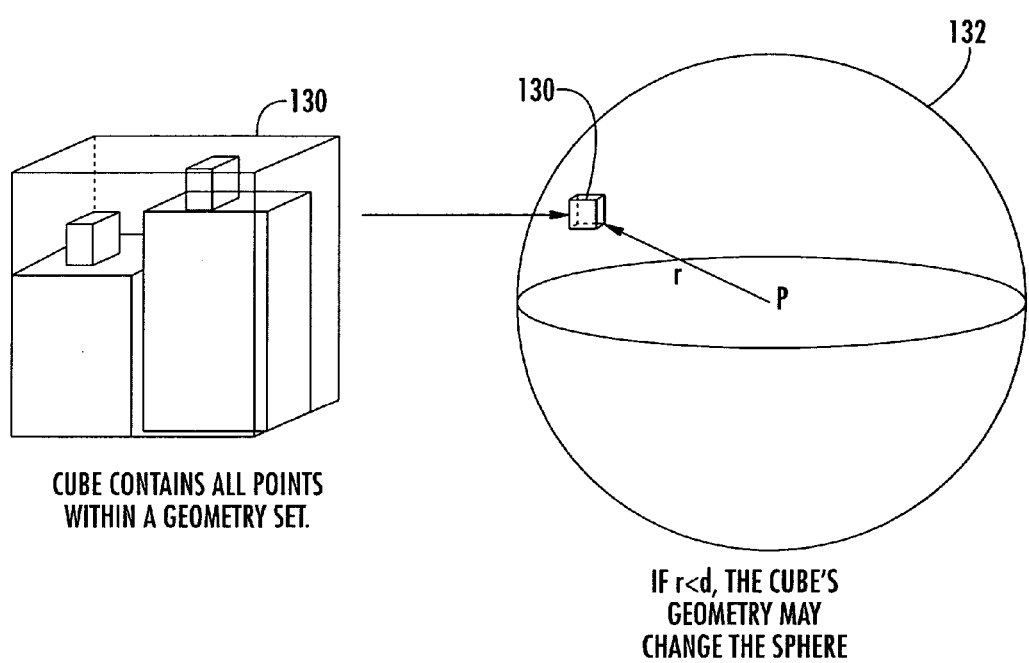
FIG. 14 is a drawing that shows a "bounding" cube containing all points within a geometry set.
Figure 15:
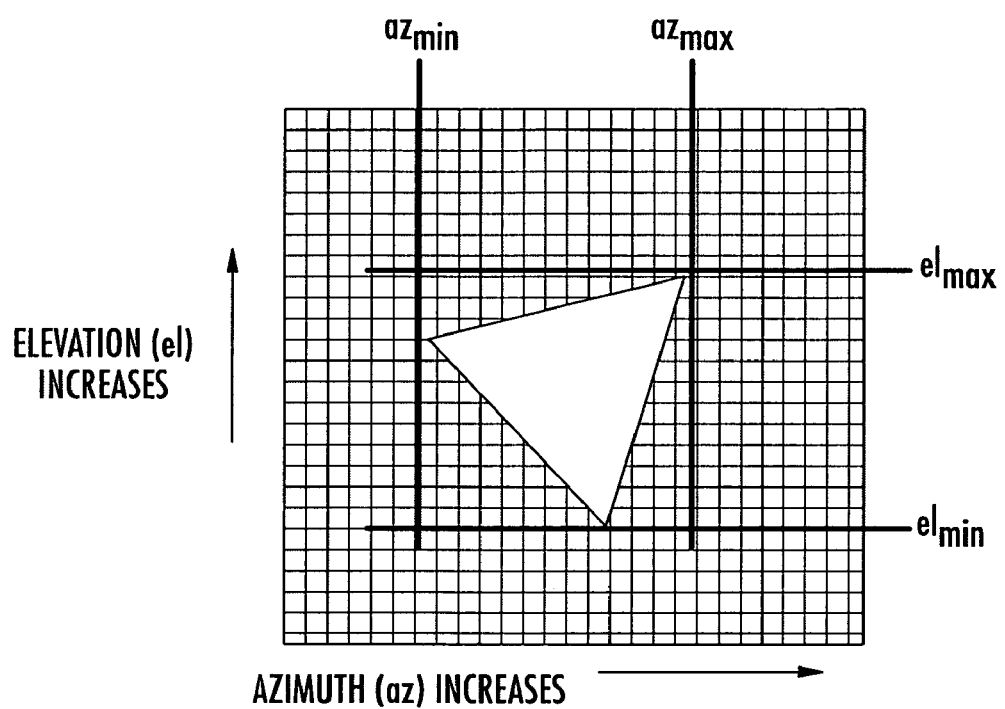
FIG. 15 is a graph of an example of a polygon, e.g., a triangle, which has its azimuth and a elevation range computed and showing an example of the minimum and maximum azimuth and elevation as described in the process shown in FIG. 6.

FIG. 14 is a graphical representation of a "bounding" cube 130, and its position relative to the Line-of-Sight point in the sphere 132. The "bounding" cube contains all points within a geometry set, and is used for determining whether a ray intersects the cube within a set distance. If the radius is less than the distance, the cube's geometry may change the sphere.

Figure 6:
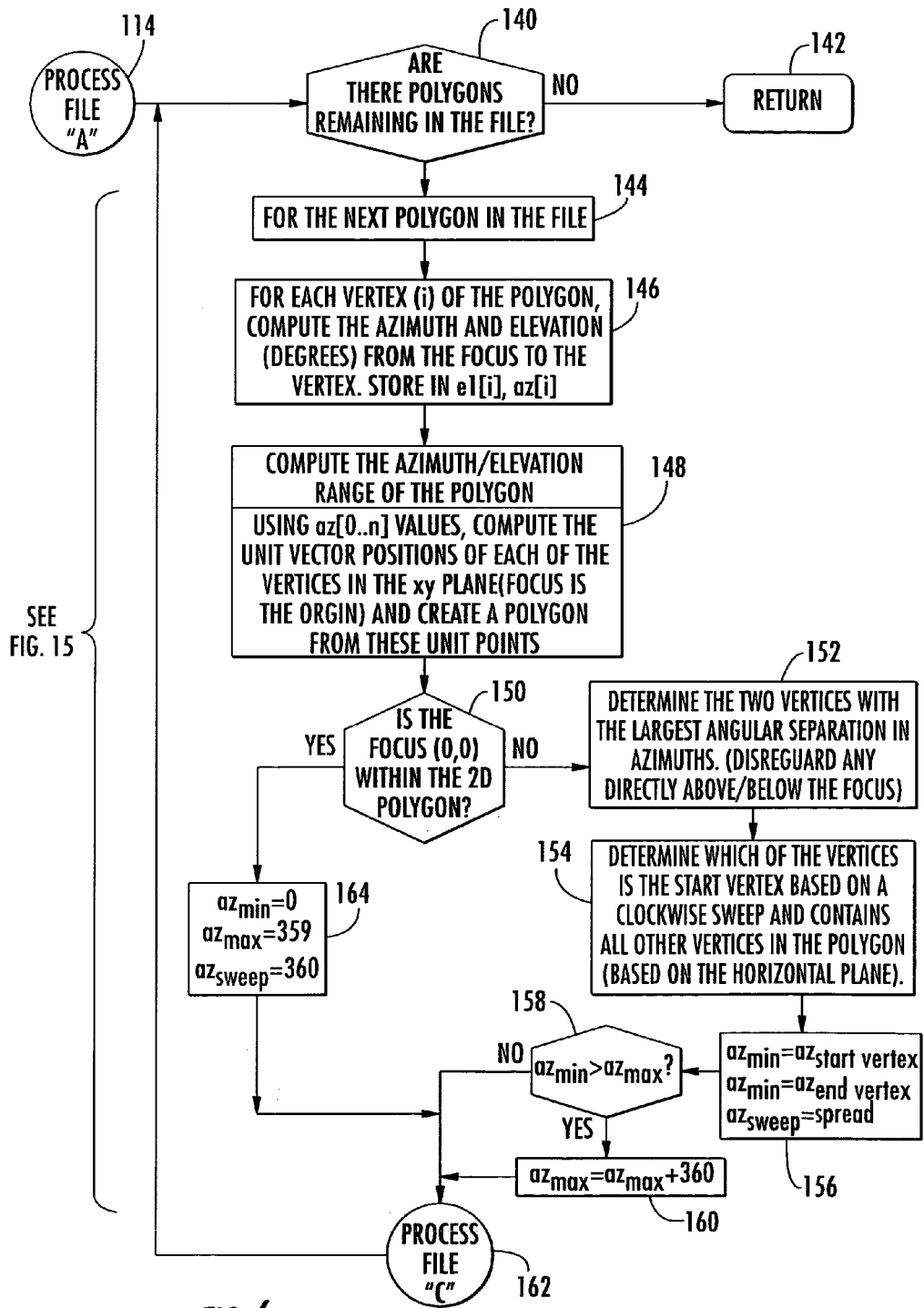
FIG. 6 is a high level flow chart showing the next series of steps for determining a Line-of-Sight volume, and showing process details for determining azimuth and elevation values of a polygon corresponding, for example, to portions of a building and used for determining a Line-of-Sight volume in accordance with the present invention.

FIG. 6 is a high level flow chart depicting the first part of the process used for determining a polygon's azimuth and elevation range. A first step in the process determines if there are polygons remaining in the file (block 140) and, if not, then the system returns (block 142). If there are polygons remaining in the file, the next polygon in the file is analyzed (block 144), and for each vertex (i) of the polygon, the azimuth and elevation in degrees is computed from the focus to the vertex (block 146). These values are stored as an elevation (el[i]) and azimuth (az[i]). The azimuth/elevation range of the polygon is computed, for example, by using the azimuth az[0 . . . n] values (block 148). This data can be used to compute the unit vector positions of each of the vertices in the xy plane (using the focus as the origin) and creating a polygon from these unit points.

Figure 7:
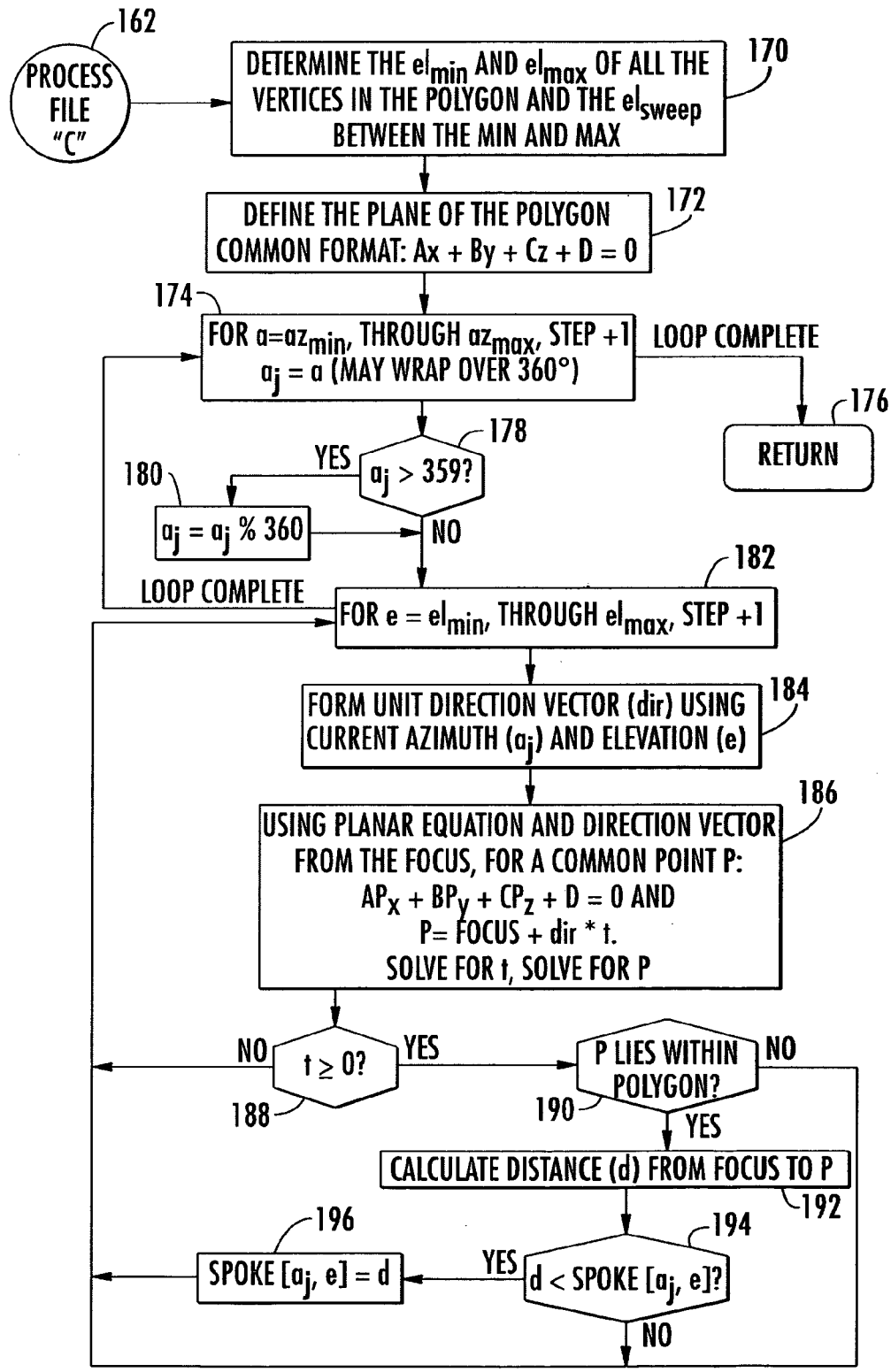
FIG. 7 is another high level flow chart showing a process for determining the elevation values for a range of polygons and determining a Line-of-Sight volume in accordance with the present invention.

At this time a determination is made whether the focus (0,0) is within the two-dimensional polygon (block 150). If not, then the two vertices with the largest angular separation and azimuth are determined (block 152). Any vertices directly above or below the focus can be disregarded. A determination is made which of the vertices is a "start" vertex based on a clockwise sweep while also containing all other vertices in the polygon based on the horizontal plane (block 154). The azimuth start and end vertex and spread are determined relative to the azimuth minimum, maximum and sweep (block 156) such that $az_{min}=az_{start\ vertex}$; $az_{max}=az_{end\ vertex}$; and $az_{sweep}$=spread. If the azimuth minimum is greater than the azimuth maximum (block 158), then the azimuth maximum equals the azimuth maximum plus 360 (block 160). In any event the next process of the algorithm shown in FIG. 7 is initiated (block 162). If the focus is within the two-dimensional polygon (block 150), the azimuth minimum equals zero, the azimuth maximum equals 359, and the azimuth sweep equals 360 (block 164), and the process shown in FIG. 7 is initiated (block 162).

As shown in FIG. 7, the minimum elevation and maximum elevation of all the vertices in the polygon and the sweep elevation between the minimum and maximum is determined. The plane of the polygon is defined in a common format, such as, Ax+By+Cz+D=0 (block 172). A determination is made which for a=minimum azimuth, through the azimuth maximum, the system proceeds one step. The system determine that $a_j$=a and may wrap over 360° (block 174). The system can return (block 176). If $a_j$ is greater than 359 (block 178), then $a_j$ is equal to $a_j$+360 (block 180). If not, then the minimum elevation through the maximum elevation is stepped plus one (block 182). A unit direction vector (dir) is formed using the current azimuth ($a_j$) and the elevation (e) (block 184). Using a planar equation and direction vector from the focus for a common point P, the equation $AP_x+BP_y+CP_z+D=0$ applies (block 186). "P" equals the focus plus the direction times the t. T can be solved for P. A determination is made whether t is greater than or equal to zero (block 188). If yes, a determination is made whether P lies within a polygon (block 190). If yes, the distance (d) is calculated from the focus to P (block 192). If P does not lie within a polygon, the system loops back. If t is not greater than or equal to zero (Block 188), the loop returns. If after calculating the distance (d) from the focus to P (block 192) a determination is made whether the distance is less than the spoke for the current azimuth and elevation [$a_j$,e] (block 194). If yes, the spoke [$a_j$,e] is equal to the distance (block 196). If not, the loop returns.

Figure 8:
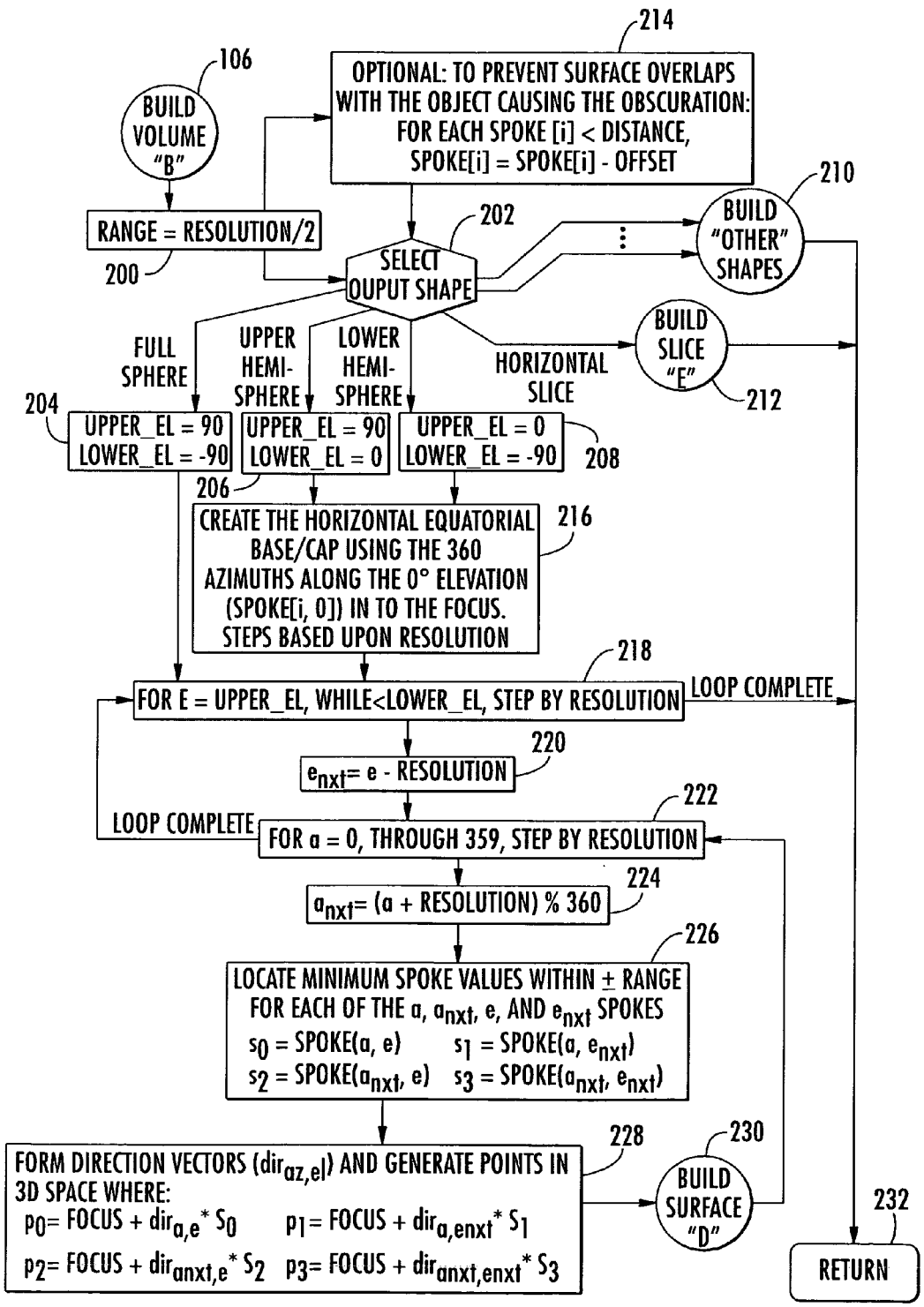
FIG. 8 is a high level flow chart showing the process for building a volume for determining the Line-of-Sight in accordance with the present invention.

FIG. 8 shows basic steps used in building the volume (block 106) where the range is the resolution divided by 2 (block 200). It is possible for a user using this algorithm to select an output shape (block 202) such as a full sphere (block 204), or a upper hemisphere (block 206) or lower hemisphere (block 208) with the various upper and lower elevations having the parameters as indicated. It is also possible to build other shapes (block 210) or build a slice (block 212) as further described in FIG. 10, and evaluate the produced sliver using the algorithm of FIG. 11. It is also optional to prevent surface overlaps with the object causing an obscuration such that for each spoke [i] that is less than a specific distance, the spoke [i] can be equal to the spoke [i] minus an offset (block 214).

If only upper or lower hemispheres are to be selected as an output shape, the horizontal equatorial base/cap is created using the 360 azimuths along the zero elevation (spoke [i,a]) in to the focus (block 216). Steps are based on resolution. Once this is accomplished (and also for a full sphere), certain steps can be made by resolution as shown in blocks 218 through 224. For e=upper elevation, while if less than the lower elevation, the system steps by resolution (block 218). The next elevations can equal the elevation minus the resolution (block 220). For azimuth equaling 0 through 359, the system steps by resolution (block 222). The next azimuth is calculated based on the azimuth plus resolution (block 224). Loops can be completed as indicated at various stages. Minimum spoke values are located as shown at block 226 and direction vectors formed and points generated in three-dimensional space as shown in block 228. A surface is built (block 230). In other stages as indicated, the system returns (block 232).

Figure 9:
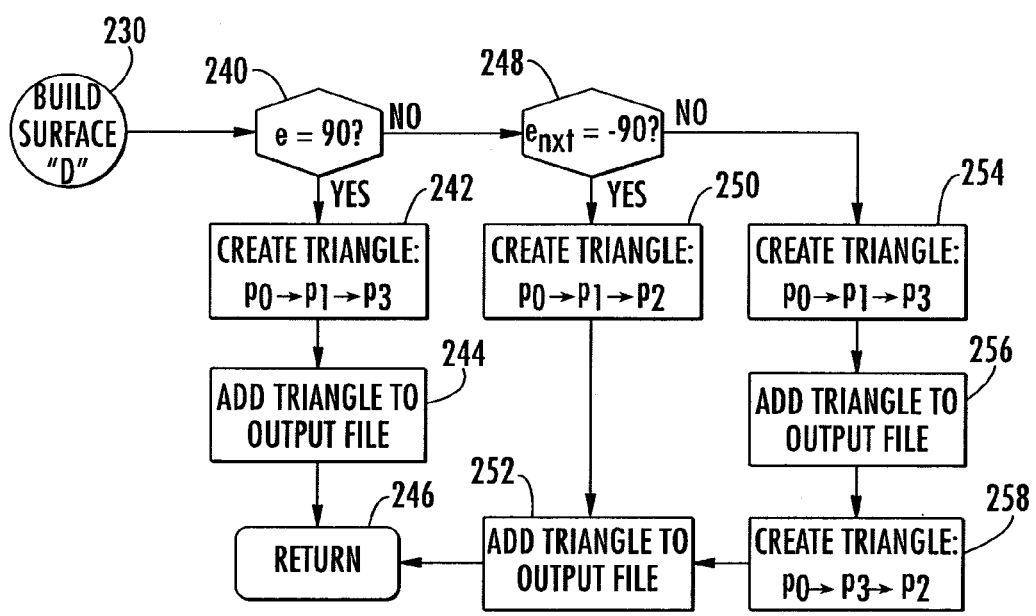
FIG. 9 is a high level flow chart showing the process for building a surface on the volume determined by the process shown in FIG. 8, in accordance with the present invention.

At this time a surface can be built as shown by the algorithm of FIG. 9 (block 230). If the elevation equals 90 (block 240), triangles are created (block 242) and added to an output file (block 244) and the system returns (block 246). If elevation does not equal 90, a determination is made whether the next elevation is −90 (block 248) and, if yes, a triangle is created with the indicated parameters (block 250) and the triangle added to the output file (block 252). If it is not −90, the triangle is created with the indicated parameters (block 254) and the triangle added to the output file (block 256) and another triangle created as indicated (block 258).

Figure 10:
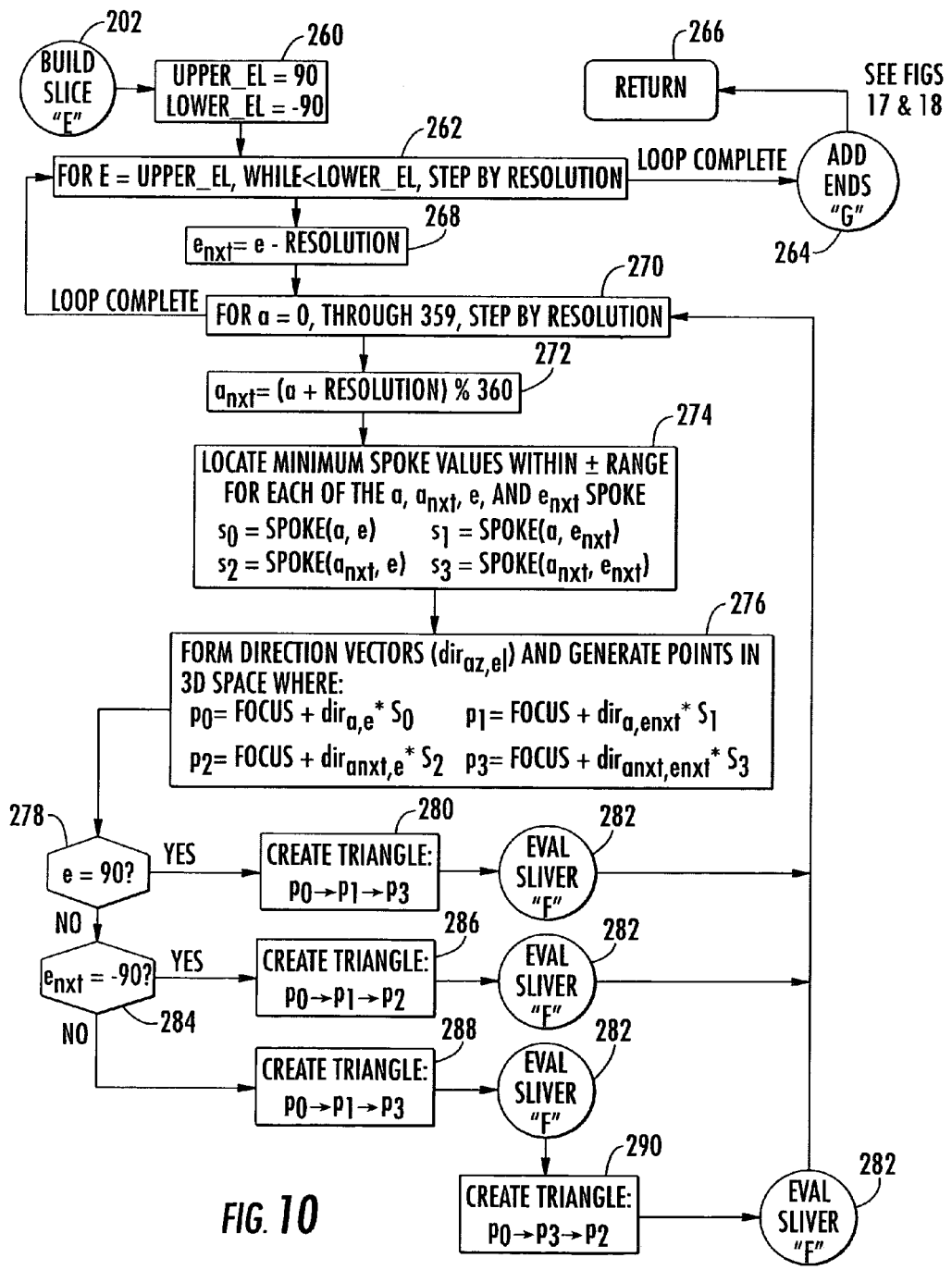
FIG. 10 is a high level flow chart showing the process for building a slice of the volume and determining a Line-of-Sight volume in accordance with the present invention.

FIG. 10 is a flow chart for the algorithm used in building a slice (block 202). The upper elevation equals 90 and the lower elevation equals −90 as indicated (Block 260). The next step processes the step by resolution for an upper elevation while less than the lower elevation (Block 262) and the loop is complete and the ends are added (Block 264) using the algorithm shown in FIG. 12. The return is made (Block 266).

Figure 17:
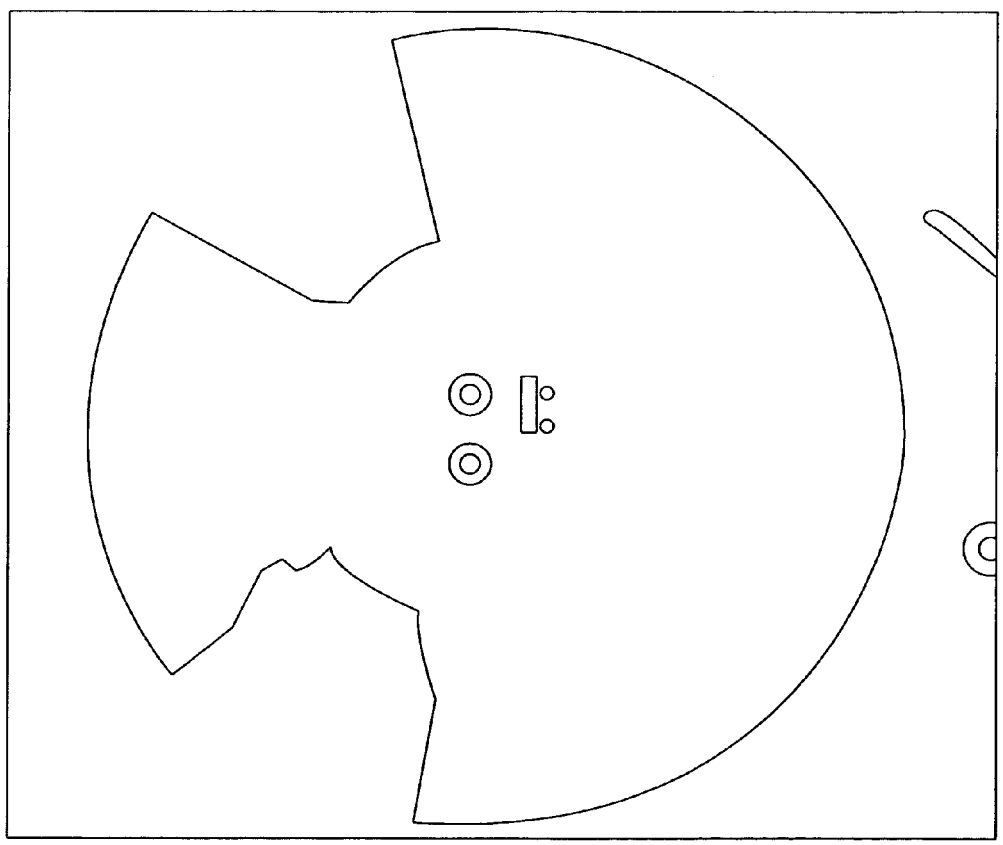
FIG. 17 is a fragmentary plan view of a Line-of-Sight slice from buildings with a 100 meter thickness.
Figure 18:
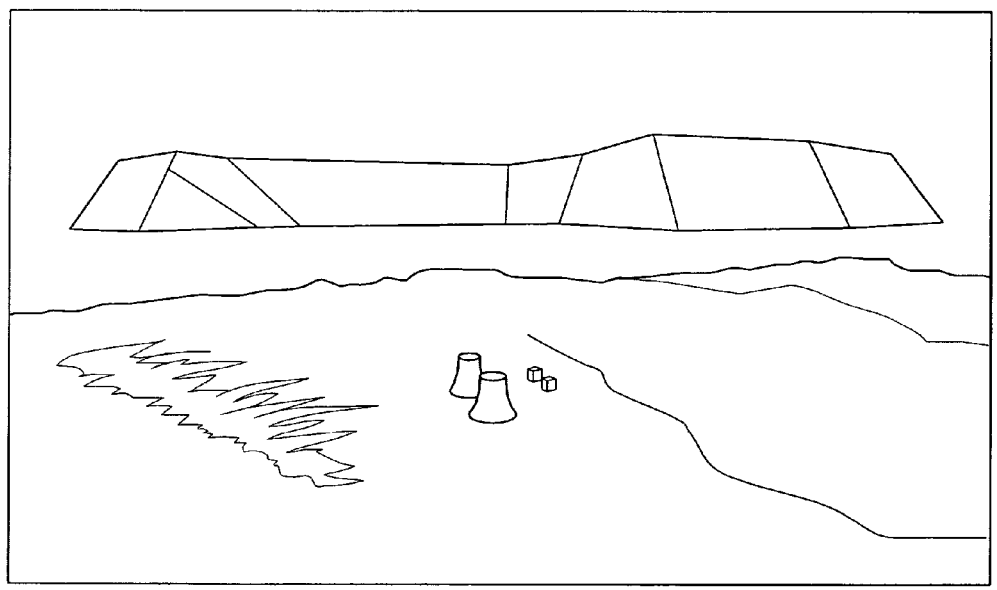
FIG. 18 is a fragmentary view of a Line-of-Sight slice shown at an angle above the buildings from the side with a 100 meter thickness.

FIGS. 17 and 18 show a Line-of-Sight slice from above buildings at 100 meter thickness (FIG. 17) and a Line-of-Sight slice above the buildings and from the side at 100 meter thickness (FIG. 18) when the ends are added.

The different steps for building the slice are shown after a determination is made that the next elevation is within the elevation resolution (block 268). For a=0, through 359, steps occur by resolution (block 270). The next azimuth is the azimuth and the resolution plus 360 degrees (block 272). The minimum spoke values within a certain range are located (block 274) and the direction vectors formed (block 276) using the indicated parameters shown in both blocks. If the elevation equals 90 (block 278) the triangle is created with the indicated parameters (block 280) and the sliver evaluated (block 282). If the elevation does not equal 90, a determination is made whether the next elevation is −90 (block 284) and, if yes, a triangle is created using the indicated parameters (block 286) and the sliver evaluated (block 282). If the next elevation is not less than 90, a triangle created with the parameters as indicated (block 288) and the sliver evaluated (block 282). A triangle is created with the indicated parameters (block 290) and then the sliver evaluated (block 282).

Figure 11:
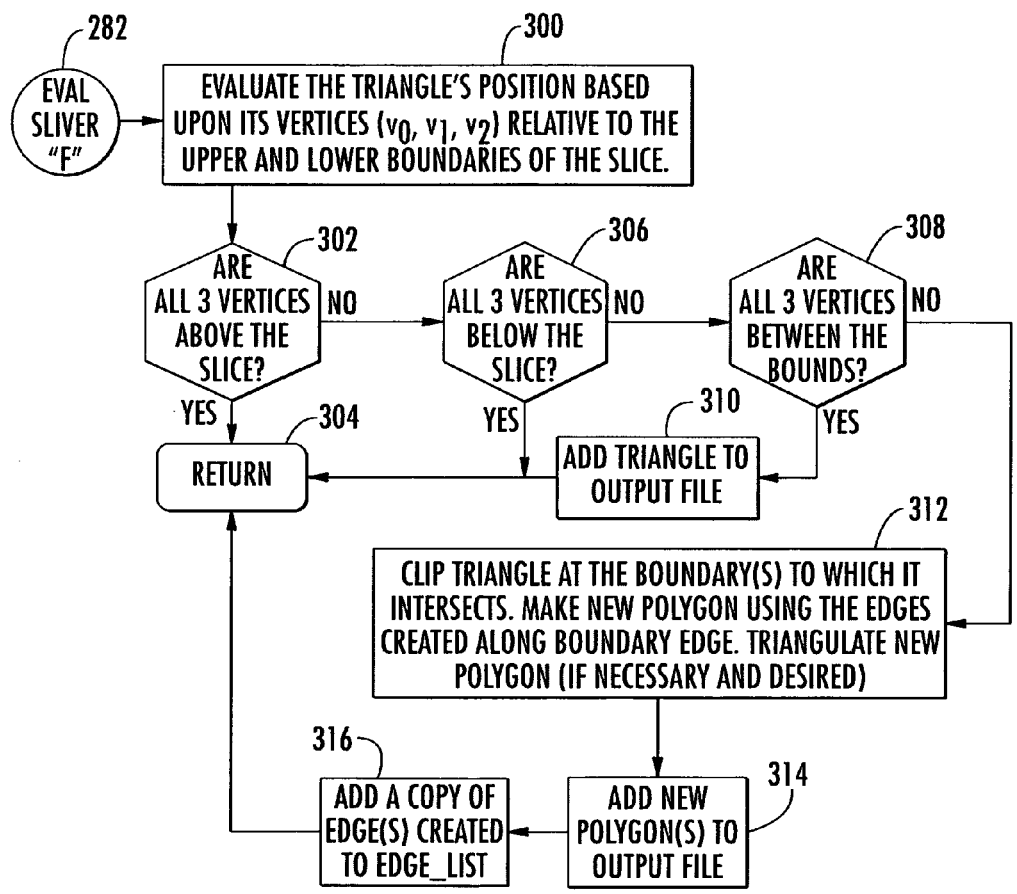
FIG. 11 is a high level flow chart showing the process for evaluating a sliver for determining a Line-of-Sight volume in accordance with the present invention.

FIG. 11 shows the steps for evaluating the sliver in which the triangle's position based upon its vertices ($V_0$, $V_1$, $V_2$) is evaluated relative to the upper and lower boundaries of the slice (block 300). If all three vertices are above the slice (block 302) the system returns (block 304). If the three vertices are not above the slice, a determination is made whether the three vertices are below the slice (block 306) and, if yes, the system returns. If the three vertices are not below the slice, a determination is made whether the three vertices are between the bounds (block 308) and, if yes, the triangle is added to the output file (block 310). If not, the triangle is clipped at the boundaries to which it intersects and a new polygon made using the edges created along the boundary edge. A new polygon can be triangulated (block 312). This new polygon can be added to the output file (block 314) and a copy of the edges created to an edge list (block 316).

Figure 12:
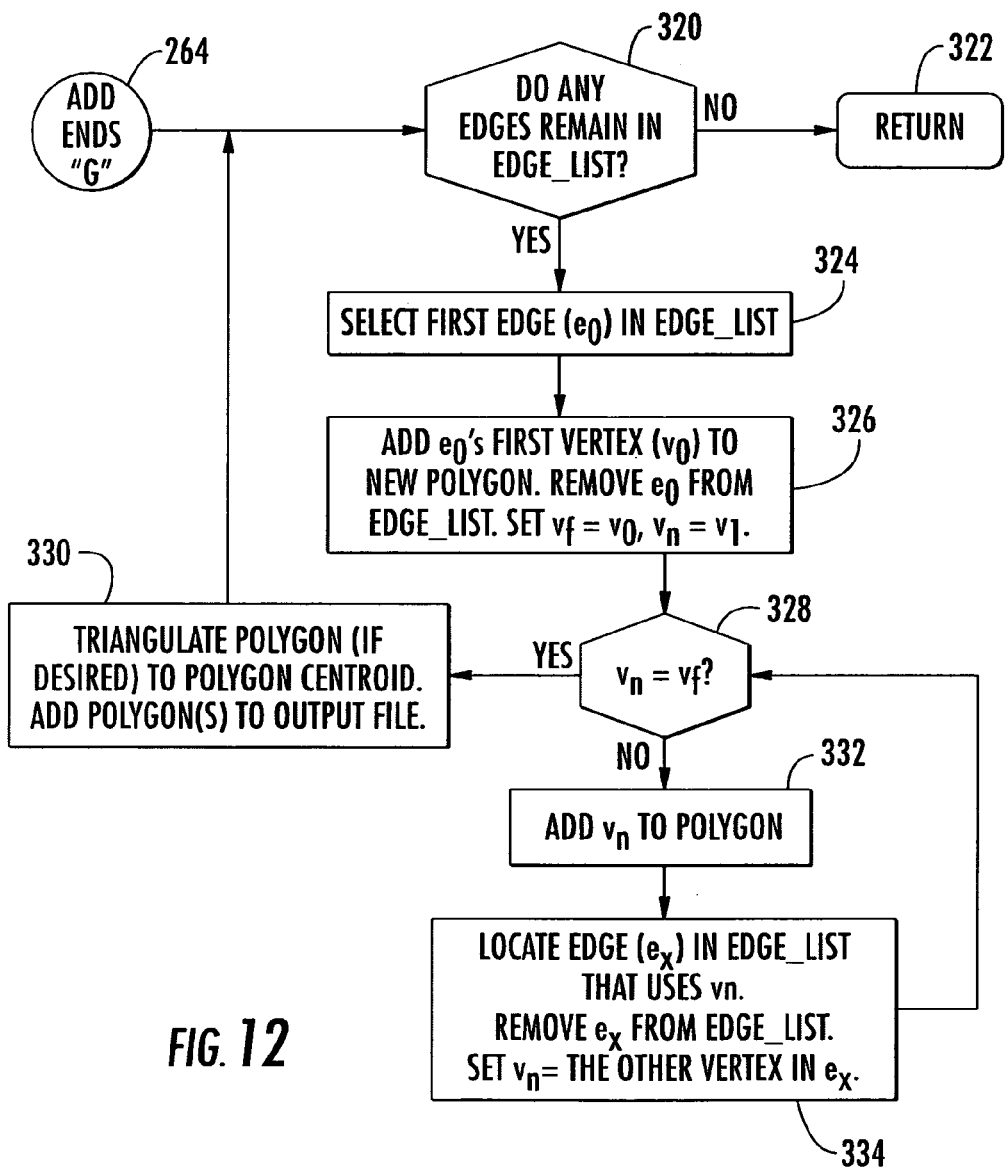
FIG. 12 is a high level flow chart showing the process for determining ends and determining a Line-of-Sight volume in accordance with the present invention.
Figures 13A, 13B:
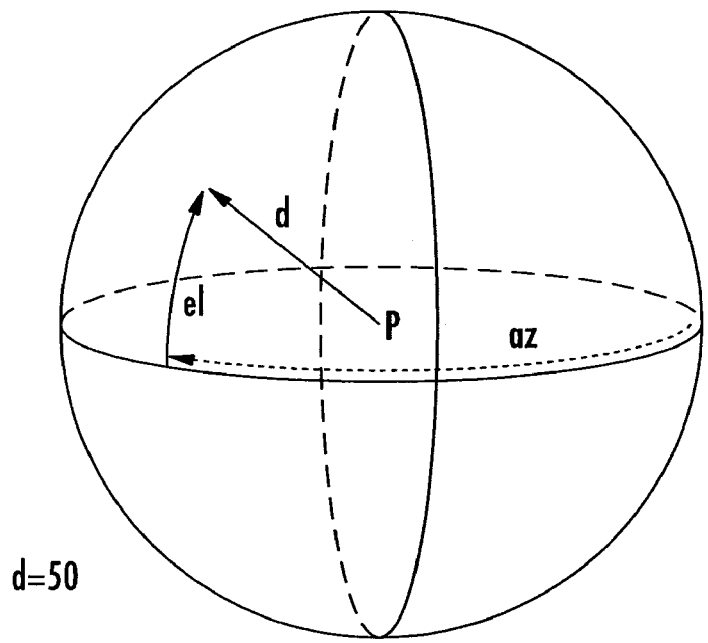
FIG. 13a is a chart showing the elevation versus azimuth in one example for creating a data structure as a spoke.
FIG. 13b is a graphical representation of a data structure as a spoke that is created to store a single real value for each azimuth that houses a full set of elevation readings.

FIG. 12 shows the algorithm for adding the ends (block 264). A determination can be made whether any edges remain in an edge list (block 320) and, if not, the system returns (block 322). If yes, first edges ($e_0$) can be chosen (block 324) and the first vertex added to a new polygon (block 326). The system removes $e_0$ from the edge list and $V_f$ is set to equal $V_0$, and $V_n$=V. A determination is made whether $V_n$=$V_f$ (block 328), and if yes the polygon is triangulated (block 330). If not $V_n$ is added to the polygon (block 332) and edges located (block 334).

Figure 16:
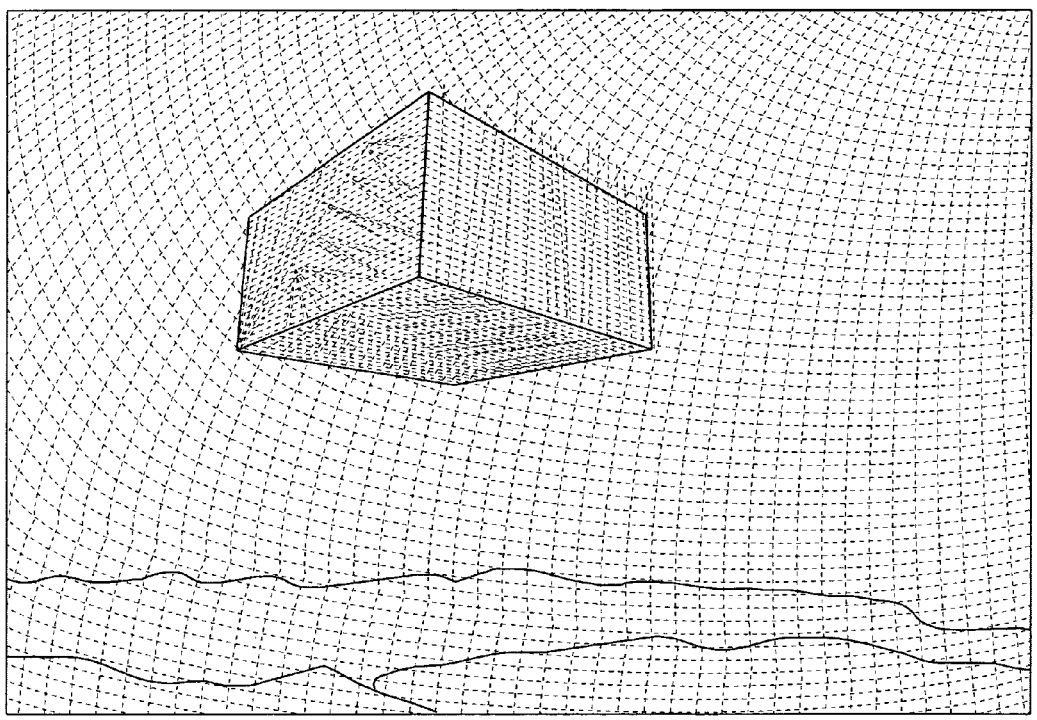
FIG. 16 is an image capture of a Line-of-Sight volume that wraps to match geometry.

FIG. 16 is an image capture of a Line-of-Sight volume that wraps to match geometry as a non-limiting example.

Figure 5:
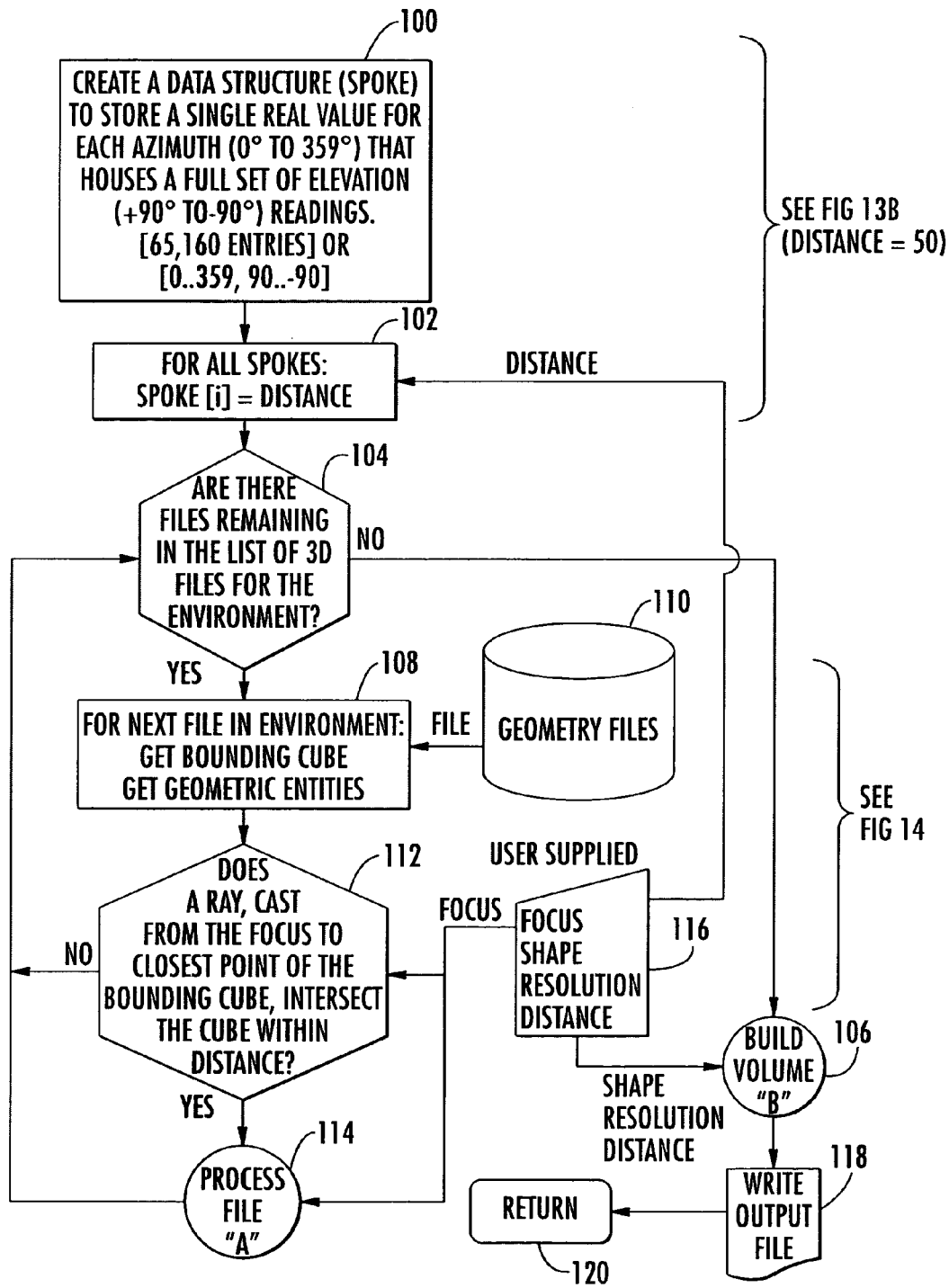
FIG. 5 is a high level flow chart showing a first series of steps for determining a "bounding" cube and the process used for creating a data structure as a spoke for determining a Line-of-Sight volume as part of the intersection calculations and volume creation algorithms in accordance with the present invention.

In one aspect of the present invention, a feature extraction program and geographic image database, such as the Real-Site™ image modeling software developed by Harris Corporation of Melbourne, Fla., can be used for determining geometry files of FIG. 5. This program can be operative with the InReality™ viewer software program also developed by Harris Corporation of Melbourne, Fla. Using this viewer with the RealSite™ image modeling software, it is possible for a user to designate a point in three-dimensional space and find the initial shape of the volume to be displayed, for example a full sphere, upper hemisphere or lower hemisphere and define the resolution at which the volume is to be displayed, for example, 2°, 5° or 10° increments. It is also possible by the present invention to define the radius of the volume to be calculated from the specified point. The InRealty™ viewer system can generate a process used for calculating the volume and automatically load it into the InReality™ viewer once the calculations are complete. The Line-of-Sight volume can be calculated by applying the intersection calculations and volume creation algorithms of the present invention from a user selected point with display parameters and scene geometry as developed by RealSite™ and InRealty™, as one non-limiting example. This solution would provide a situation planner immediate information as to what locations in a three-dimensional space have a Line-of-Sight to a specific location within a three-dimensional model of an area of interest. Thus, it would be possible for a user to move to any point in the scene and determine the Line-of-Sight to the point. For example, by selecting the corner of a building, a police SWAT team can immediately know the Line-of-Sight that a sharpshooter, at that location, has throughout a city. The speed of calculations is dependent upon the amount of geometry in the model, but the volumes are normally computed in under a minute. By using the InReality™ viewer program, the system goes beyond providing basic mensuration and displaying capabilities.

As noted before, the present invention uses modified ray tracing for three-dimensional computer graphic generation and rendering an image. For purposes of description, the location, i.e., the latitude and longitude of any object that would effect the Line-of-Sight can be located and determined via a look-up table of feature extraction from the geographic image database associated with RealSite™ program as described above. This geographic database could include data relating to the natural and man-made features in a specific area, including data about buildings and natural land formations, such as hills, which all would effect the Line-of-Sight calculations.

For example, a database could include information about a specific area, such as a tall building or water tower. A look-up table could have similar data and a system processor would interrogate and determine from the look-up table the type of buildings or natural features to determine the geometric features.

For purposes of illustration, a brief description of an example of a feature extraction program that could be used with the present invention, such as the described RealSite™, is now set forth. Naturally, many different types of feature extraction software are available to one skilled in the art, and can be used with the present invention. The database could also be used with two-dimensional or three-dimensional feature imaging. Optical reflectivity can be used for finding building plane surfaces and building edges.

Further details of a texture mapping system used for creating three-dimensional urban models is disclosed in commonly assigned U.S. Pat. No. 6,744,442, the disclosure which is hereby incorporated by reference in its entirety. For purposes of description, a high level review of feature extraction using RealSite™ is first set forth. This type of feature extraction software can be used to validate results and find the natural and man-made objects for Line-of-Sight calculations and can be used in two-dimensional and three-dimensional modes.

RealSite™ allows the creation of three-dimensional models in texture mapping systems and extends the technology used for terrain texturing to building texture by applying clip mapping technology to urban scenes. It can be used to determine optical reflectivity values and even radio frequency reflectivity.

It is possible to construct a single image of a building from many images that are required to paint all the sites. Building site images can fit into a composite image of minimum dimension, including rotations and intelligent arrangements. Any associated building vertex texture coordinates can be scaled and translated to match new composite images. The building images can be arranged in a large "clip map" image, preserving the horizontal relationships of the buildings. If the horizontal relationships cannot be accurately preserved, a "clip grid" middle layer can be constructed, which can be used by the display software to accurately determine the clip map center.

At its highest level, the system creates a packed rectangle of textures for each of a plurality of three-dimensional objects corresponding to buildings to be modeled for a geographic site. The system spatially arranges the packed rectangle of textures in a correct position within a site model clip map image. The texture mapping system can be used with a computer graphics program run on a host or client computer having an OpenGL application programming interface. The location of a clip center with respect to a particular x,y location for the site model clip map image can be determined by looking up values within a look-up table, which can be built by interrogating the vertices of all building polygon faces for corresponding texture coordinates. Each texture coordinate can be inserted into the look-up table based on the corresponding polygon face vertex coordinate.

In these types of systems, the graphics hardware architecture could be hidden by a graphics API (Application Programming Interface). Although different programming interfaces could be used, a preferred application programming interface is an industry standard API such as OpenGL, which provides a common interface to graphics functionality on a variety of hardware platforms. It also provides a uniform interface to the texture mapping capability supported by the system architecture.

OpenGL allows a texture map to be represented as a rectangular pixel array with power-of-two dimensions, i.e., $2^m \times 2^n$. To increase rendering speed, some graphics accelerators use pre-computed reduced resolution versions of the texture map to speed up the interpolation between sampled pixels. The reduced resolution image pyramid layers are referred to as MIPmaps by those skilled in the art. MIPmaps increase the amount of storage each texture occupies by 33%.

OpenGL can automatically compute the MIPmaps for a texture, or they can be supplied by the application. When a textured polygon is rendered, OpenGL loads the texture and its MIPmap pyramid into the texture cache. This can be very inefficient if the polygon has a large texture, but happens to be far away in the current view such that it only occupies a few pixels on the screen. This is especially applicable when there are many such polygons.

Further details of OpenGL programming are found in Neider, Davis and Woo, OpenGL Programming Guide, Addison-Wesley, Reading, Mass., 1993, Chapter 9, the Guide disclosure which is hereby incorporated by reference in its entirety.

Clip texturing can also be used, which improves rendering performance by reducing the demands on any limited texture cache. Clip texturing can avoid the size limitations that limit normal MIPmaps by clipping the size of each level of a MIPmap texture to a fixed area clip region.

Further details for programming and using clip texturing can be found in Silicon Graphics, IRIS Performer Programmer's Guide, Silicon Graphics, Chapter 10: Clip Textures, the Programmer's Guide, which is hereby incorporated by reference in its entirety.

IRIS Performer is a three-dimensional graphics and visual simulation application programming interface that lies on top of OpenGL. It provides support for clip texturing that explicitly manipulates the underlying OpenGL texture mapping mechanism to achieve optimization. It also takes advantage of special hardware extensions on some platforms. Typically, the extensions are accessible through OpenGL as platform specific (non-portable) features.

In particular, IRIS Performer allows an application to specify the size of the clip region, and move the clip region center. IRIS Performer also efficiently manages any multi-level paging of texture data from slower secondary storage to system RAM to the texture cache as the application adjusts the clip center.

Preparing a clip texture for a terrain surface (DEM) and applying it can be a straightforward software routine in texture mapping applications, as known to those skilled in the art. An image or an image mosaic is orthorectified and projected onto the terrain elevation surface. This single, potentially very large, texture is contiguous and maps monotonically onto the elevation surface with a simple vertical projection.

Clip texturing an urban model, however, is less straightforward of a software application. Orthorectified imagery does not always map onto vertical building faces properly. There is no projection direction that will map all the building faces. The building textures comprise a set of non-contiguous images that cannot easily be combined into a monotonic contiguous mosaic. This problem is especially apparent in an urban model having a number of three-dimensional objects, typically representing buildings and similar vertical structures. It has been found that it is not necessary to combine contiguous images into a monotonic contiguous mosaic. It has been found that sufficient results are achieved by arranging the individual face textures so that spatial locality is maintained.

Figure 19:
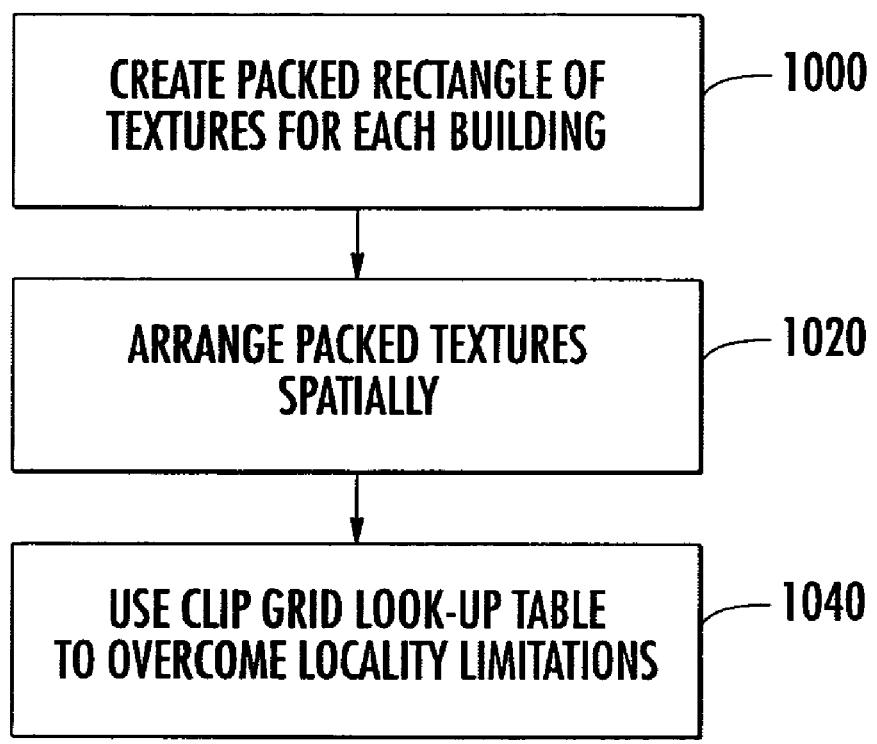
FIGS. 19 and 20 are flow charts for an image database routine that could be used in conjunction with the process for determining a Line-of-Sight volume in accordance with the present invention.

FIG. 19 illustrates a high level flow chart illustrating basic aspects of a texture application software model, such as could be used in conjunction with the present invention as related to geolocating a mobile transmitting unit. The system creates a packed rectangle of textures for each building (block 1000). The program assumes that the locality is high enough in this region that the actual arrangement does not matter. The packed textures are arranged spatially (block 1020). The spatial arrangement matters at this point, and there are some trade-offs between rearranging things and clip region size. A clip grid look-up table, however, is used to overcome some of the locality limitations (block 1040), as explained in detail below.

Figure 20:
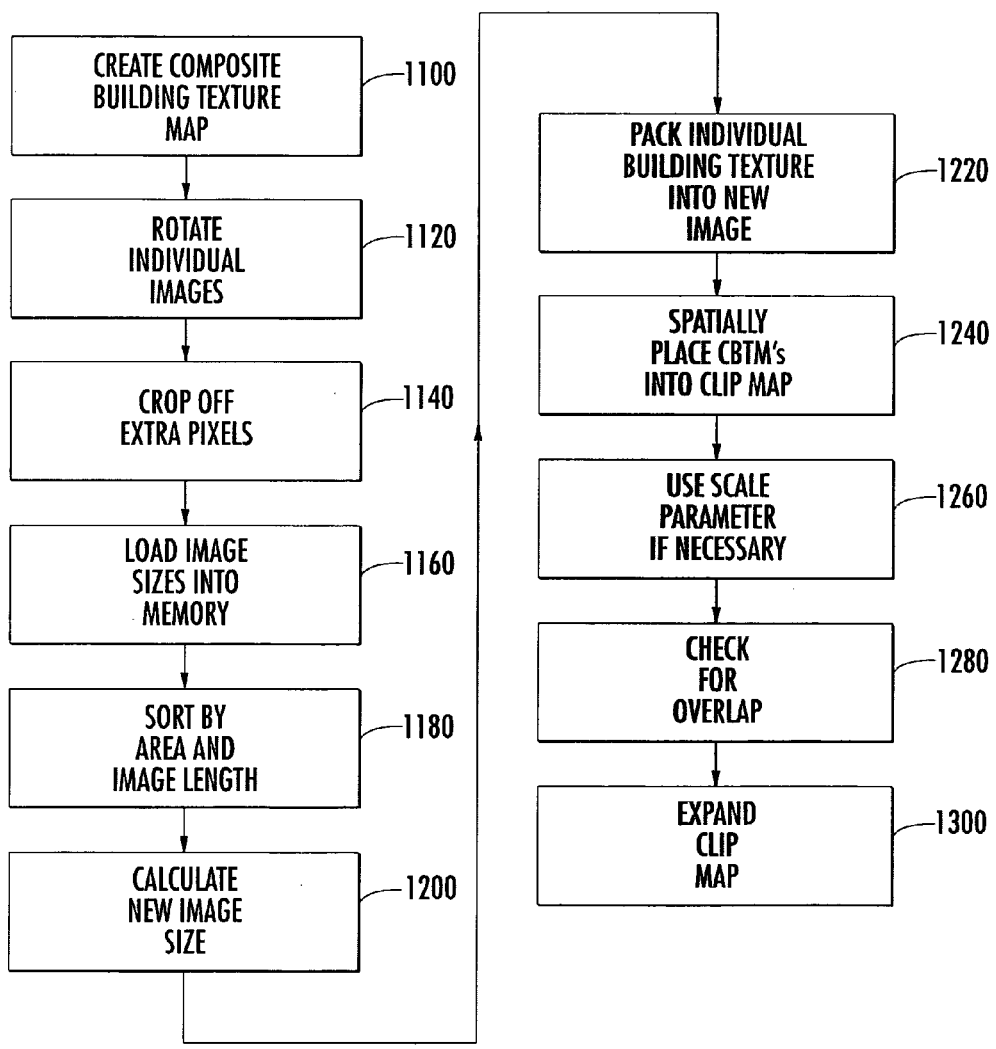

Referring now to FIG. 20, a more detailed flow chart sets forth the sequence of steps. A composite building texture map (CBTM) is created (block 1100). Because of tiling strategies used later in a site model clip mapping process, all images that are used to texture one building are collected from different viewpoints and are packed into a single rectangular composite building texture map. To help reduce the area of pixels included in the CBTM, individual images (and texture map coordinates) are rotated (block 1120) to minimize the rectangular area inside the texture map actually supporting textured polygons. After rotation, extra pixels outside the rectangular footprint are cropped off (block 1140).

Once the individual images are pre-processed, image sizes for each contributing image are loaded into memory (block 1160). These dimensions are sorted by area and image length (block 1180). A new image size having the smallest area, with the smallest perimeter, is calculated, which will contain all the building's individual textures (block 1200). The individual building textures are efficiently packed into the new image by tiling them alternately from left to right and vice versa, such that the unused space in the square is minimized (block 1220).

Figure 21:
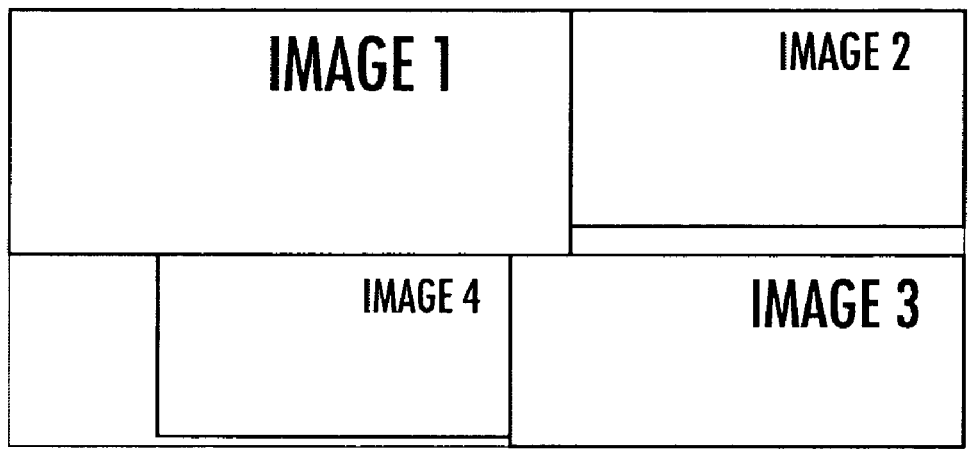
FIG. 21 is a layout of individual images of a building and texture model that can be used in conjunction with the process for determining a Line-of-Sight volume in accordance with the present invention.

FIG. 21 illustrates an example of a layout showing individual images of a building in the composite building texture map. This is accomplished by an exhaustive search as described to calculate the smallest image dimensions describing each building.

A site model clip map image is next created. Because each composite building texture map (CBTM) is as small as possible, placing each one spatially correct in a large clip map is realizable. Initially, each composite building texture map is placed in its correct spatial position in a large site model clip map (block 1240). A scale parameter is used to initially space buildings at further distances from each other while maintaining relative spatial relations (block 1260). Then each composite building texture map is checked for overlap against the other composite building texture maps in the site model clip map (block 1280). The site model clip map is expanded from top right to bottom left until no overlap remains (block 1300). For models with tall buildings, a larger positive scale parameter may be used to allow for the increased likelihood of overlap. All texture map coordinates are scaled and translated to their new positions in the site model clip map image.

Figure 22:
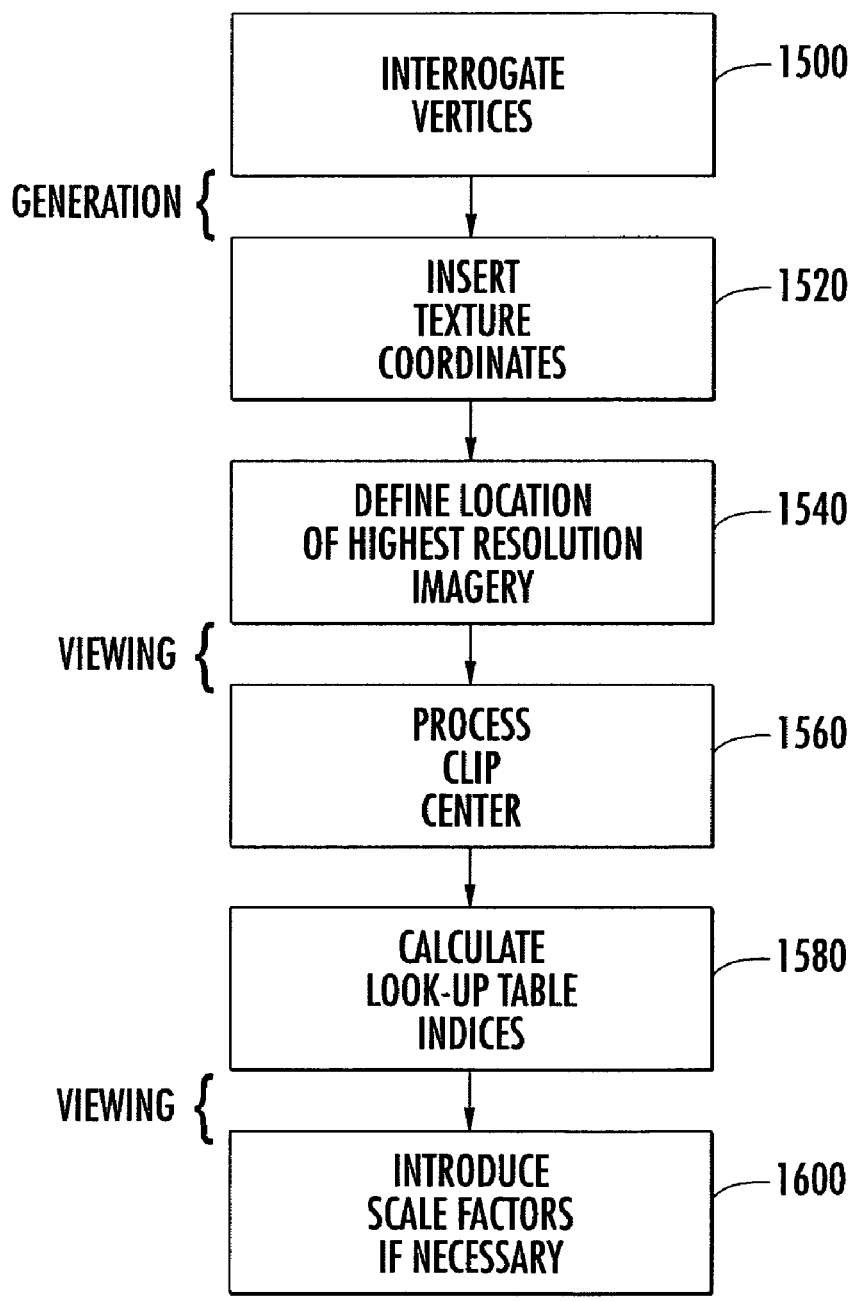
FIG. 22 is a flow chart showing the type of process that could be used with the image database routine shown in FIGS. 19 and 20.

Referring now to FIG. 22, a flow chart illustrates the basic operation that can be used to process and display building clip textures correctly. A clip map clip grid look-up table is used to overcome these limitations and pinpoint the exact location of where the clip center optimally should be located with respect to a particular x,y location. To build the table, the vertices of all the building polygon faces are interrogated for their corresponding texture coordinates (block 1500). Each texture coordinate is inserted into a look-up table based on its corresponding polygon face vertex coordinates (block 1520).

A clip center or point in the clip map is used to define the location of the highest resolution imagery within the clip map (block 1540). Determining this center for a terrain surface clip map is actually achievable with little system complexity because a single clip texture maps contiguously onto the terrain elevation surface, so the camera coordinates are appropriate. The site model clip map has a clip center of its own and is processed according to its relative size and position on the terrain surface (block 1560). The site model clip map, however, does introduce some locality limitations resulting from tall buildings or closely organized buildings. This necessitates the use of an additional look-up table to compensate for the site model clip map's lack of complete spatial coherence. The purpose of the clip grid is to map three-dimensional spatial coordinates to clip center locations in the spatially incoherent clip map.

The clip grid look-up table indices are calculated using a x,y scene location (the camera position) (block 1580). If the terrain clip map and site model clip map are different sizes, a scale factor is introduced to normalize x,y scene location for the site model clip map (block 1600). It has been found that with sufficient design and advances in the development of the spatial correctness of the building clip map, the need for the clip grid look-up table can be eliminated in up to 95% of the cases.

It is also possible to extend the algorithm and use multiple site model clip maps. Using many smaller clip maps rather than one large clip map may prove to be a useful approach if clip maps of various resolutions are desired or if the paging in and out of clip maps from process space is achievable. However, it requires the maintenance of multiple clip centers and the overhead of multiple clip map pyramids.

The RealSite™ image modeling software has advantages over traditional methods because models can be very large (many km$^2$) and can be created in days versus weeks and months of other programs. Features can be geodetically preserved and can include annotations and be geospatially accurate, for example, one meter or two meter relative. Textures can be accurate and photorealistic and chosen from the best available source imagery and are not generic or repeating textures. The InReality™ program can provide mensuration where a user can interactively measure between any two points and obtain an instant read-out on the screen of a current distance and location. It is possible to find the height of a building, the distance of a stretch of highway, or the distance between two rooftops along with Line-of-Sight information in accordance with the present invention. There are built-in intuitive navigation controls with motion model cameras that "fly" to a desired point of view. The InReality™ viewer can be supported under two main platforms and operating systems: (1) the SGI Onyx2 Infinite Reality2™ visualization supercomputer running IRIX 6.5.7 or later and an X86-based PC running either Microsoft WindowsNT 4.0 or Windows 98 or more advanced systems. The IRIX version of the InReality™ viewer can take full advantage of high-end graphics capabilities provided by Onyx2 such as MIPMapping in the form of clip textures, multi-processor multi-threading, and semi-immersive stereo visualization that could use crystallized by stereographics. InReality™ for Windows allows great flexibility and scalability and can be run on different systems.

Crystal Eyes produced by Stereo Graphics Corporation can be used for stereo 3D visualization. Crystal Eyes is an industry standard for engineers and scientists who can develop, view and manipulate 3D computer graphic models. It includes liquid crystal shutter eyewear for stereo 3D imaging.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for determining a Line-of-Sight volume for a specified point within a three dimensional model comprising:
   a focus point defined in three dimensional space;
   a plurality of data files each corresponding to a geographic feature that may impact a Line-of-Sight from the focus, each data file having data about geometric entities that make-up a geographic feature; and
   a processor operative for processing the data files and creating a series of polygons that represent a shell of a Line-of-Sight volume to the focus at a specified resolution based on the processed data files.

2. A system according to claim 1, wherein the processor is operative for processing each data file as a minimally-sized bounding volume that contains the geometric entities that make-up a geographic feature and determining if a ray cast from the focus to the closest point of the bounding volume intersects the initial shape of the volume within the specified distance.

3. A system according to claim 1, wherein a geographic feature comprises a building.

4. A system according to claim 1, and further comprising a single output file as a series of polygons that represent the shell of the Line-of-Sight volume.

5. A system according to claim 1, wherein said processor is operative for computing the azimuth and elevation range of a polygon and determining the distance from the focus to a point lying within the polygon.

6. A system according to claim 1, wherein each data file comprises a collection of polygons with each polygon's vertices contained within a common plane.

7. A system according to claim 1, wherein each polygon comprises a triangle.

8. A system according to claim 1, wherein said processor is operative for changing the resolution to enhance rendering speed for calculating the shell of the Line-of-Sight volume.

9. A system according to claim 1, wherein said processor is operative for defining different surfaces of the shell.

10. A system according to claim 9, wherein said shell comprises a general spline based or NURBS (Nonuniform Rational B-Splines) surface.

11. A system for determining a Line-of-Sight volume for a specified point within a three dimensional model comprising:
   a focus point defined in three dimensional space as part of an initial shape for a volume defined as if there were no obstructions from the focus based on a specified distance;
   a plurality of data files each corresponding to a geographic feature that may impact a Line-of-Sight from the focus, each data file having data about geometric entities that make-up a geographic feature; and
   a processor operative for processing the data files and creating a series of polygons that represent a shell of a Line-of-Sight volume to the focus at a specified resolution based on the processed data files.

12. A system according to claim 11, wherein said initial shape comprises a full hemisphere shape.

13. A system according to claim 11, wherein said initial shape comprises one of an upper or lower hemisphere.

14. A system according to claim 11, wherein said initial shape comprises a horizontal cross section of a sphere having user defined upper and lower vertical distances either relative to the focus or if geospatially referenced in absolute altitudes.

15. A system according to claim 11, wherein said initial shape comprises longitudinal hemispheres based on either selected directions or an amount of obscuration.

16. A system according to claim 11, wherein said initial shape comprises conical shapes from one selected point towards the focus with a selected field of view angle.

17. A system according to claim 11, wherein the processor is operative for processing each data file as a minimally-sized bounding volume that contains the geometric entities that make-up a geographic feature and determining if a ray cast from the focus to the closest point of the bounding volume intersects the initial shape of the volume within the specified distance.

18. A system according to claim 11, wherein a geographic feature comprises a building.

19. A system according to claim 11, and further comprising a single output file as a series of polygons that represent the shell of the Line-of-Sight volume.

20. A system according to claim 11, wherein said processor is operative for computing the azimuth and elevation range of a polygon and determining the distance from the focus to a point lying within the polygon.

21. A system according to claim 11, wherein each data file comprises a collection of polygons with each polygon's vertices within a common plane.

22. A system according to claim 11, wherein each polygon comprises a triangle.

23. A system according to claim 11, wherein said processor is operative for changing the resolution to enhance rendering speed in calculating the shell of the Line-of-Sight volume.

24. A system according to claim 11, wherein said processor is operative for defining different surfaces of the shell.

25. A system according to claim 24, wherein said shell comprises a general spline based or NURBS (Nonuniform Rational B-Splines) surface.

26. A method for determining a Line-of-Sight volume for a specified point within a three dimensional model, which comprises:
   designating a point in three dimensional space as a focus;
   processing a plurality of data files, each data file corresponding to a geographic feature that may impact a Line-of-Sight from the focus, wherein each data file includes data about geometric entities that make-up a geographic feature; and creating a series of polygons that represent a shell of a Line-of-Sight volume to the focus at a specified resolution based on the processed data files.

27. A method according to claim 26, which further comprises processing each data file as a minimally-sized bounding volume that contains the geometric entities that make-up a geographic feature and determining if a ray case from the focus to the closest point of the bounding volume intersects the initial shape of the volume within the specified distance.

28. A method according to claim 26, which further comprises creating a single output file as a series of polygons that represent the shell of the Line-of-Sight volume to the focus.

29. A method according to claim 26, which further comprises computing the azimuth and elevation range of a polygon and determining the distance from the focus to a point lying within the polygon.

30. A method according to claim 26, which further comprises defining each data file comprises as a collection of polygons with each polygon's vertices in a common plane.

31. A method according to claim 26, which further comprises defining each polygon as a triangle.

32. A method according to claim 26, which further comprises changing the resolution to enhance rendering speed in calculating the shell of the Line-of-Sight volume.

33. A method according to claim 26, which further comprises defining different surfaces of the shell.

34. A method according to claim 33, which further comprises defining a general spline based or NURBS (Non-uniform Rational B-Splines) surface.

35. A method for determining a Line-of-Sight volume for a specified point within a three dimensional model, which comprises:

designating a point in three dimensional space as a focus;

generating an initial shape of a volume as if there were no obstructions from the focus based on a specified distance;

processing a plurality of data files, each corresponding to a geographic feature that may impact a Line-of-Sight from the focus, wherein each data file includes data about geometric entities that make-up a geographic feature; and creating a series of polygons that represent a Line-of-Sight volume to the focus at a specified resolution based on the processed data files.

36. A method according to claim 35, which further comprises generating a full hemisphere shape.

37. A method according to claim 35, which further comprises generating one of an upper or lower hemisphere shape.

38. A method according to claim 35, which further comprises generating a horizontal cross section of a sphere having user defined upper and lower vertical distances either relative to the focus or if geospatially referenced in absolute altitudes.

39. A method according to claim 35, which further comprises generating longitudinal hemispheres based on either selected directions or an amount of obscuration.

40. A method according to claim 35, which further comprises generating conical shapes from one selected point towards the focus with a selected field of view angle.

41. A method according to claim 35, which further comprises processing each data file as a minimally-sized bounding volume that contains the geometric entities that make-up a geographic feature and determining if a ray case from the focus to the closest point of the bounding volume intersects the initial shape of the volume within the specified distance.

42. A method according to claim 35, which further comprises creating a single output file as a series of polygons that represent a shell of the Line-of-Sight volume to the focus.

43. A method according to claim 35, which further comprises computing the azimuth and elevation range of a polygon and determining the distance from the focus to a point lying within the polygon.

44. A method according to claim 35, which further comprises defining each data file comprises as a collection of polygons with each polygon's vertices in a common plane.

45. A method according to claim 35, which further comprises defining each polygon as a triangle.

46. A method according to claim 35, which further comprises changing the resolution to enhance rendering speed in calculating the shell of the Line-of-Sight volume.

47. A method according to claim 35, which further comprises defining different surfaces of the shell.

48. A method according to claim 47, which further comprises defining a general spline based or NURBS (Non-uniform Rational B-Splines) surface.

* * * * *